United States Patent [19]

Thomas et al.

[11] Patent Number: 4,982,196

[45] Date of Patent: Jan. 1, 1991

[54] RADAR TARGET SIMULATOR

[75] Inventors: Robert W. Thomas, Annandale, Va.; John D. Yaron, Cockeysville, Md.

[73] Assignee: Westinghouse Electric Corp., Pittsburgh, Pa.

[21] Appl. No.: 422,341

[22] Filed: Oct. 16, 1989

[51] Int. Cl.⁵ ............................................. G01S 7/40
[52] U.S. Cl. ..................................... 342/172; 342/169
[58] Field of Search ............................... 342/169, 172

[56] References Cited

U.S. PATENT DOCUMENTS

| | | |
|---|---|---|
| 3,160,882 | 12/1964 | Stimler et al. |
| 3,323,123 | 5/1967 | Hegarty et al. |
| 3,374,481 | 3/1968 | Lupinetti |
| 3,641,574 | 2/1972 | Douglas |
| 4,049,953 | 9/1977 | Evans, Jr. |
| 4,168,502 | 9/1979 | Susie |
| 4,435,712 | 3/1984 | Kipp |
| 4,450,447 | 5/1984 | Zebker et al. |
| 4,683,473 | 7/1987 | Haugland |
| 4,737,792 | 4/1988 | Grone |

Primary Examiner—Thomas H. Tarcza
Assistant Examiner—Mark Hellner
Attorney, Agent, or Firm—John K. Williamson

[57] ABSTRACT

The present invention provides a radar simulation system with at least two counters. The first counter is a coarse counter 20/30 that counts a transmit pulse interpulse periods to provide a coarse return delay at the beginning of a radar look. The second counter is a fine counter 22/36 which counts, after the coarse counter has counted down to zero, from each subsequent transmit pulse to the time for the return pulse. Once the coarse counter has finished counting, the fine counter, which can be reset and reloaded during the look responsive to each transmit pulse, can provide return targets repeating at the same distance at the pulse repetition frequency. A cyclic counter 24 can also be added that produces the return pulses by cyclically counting the interpulse period one the fine counter has timed out. If the cyclic counter is used the fine counter is not reloaded during the look. If the target moves more than the range resolution of the radar during the radar look, a phase-in counter 70 and secondary return counter 66 adjust the delay of the return pulses to simulate target movement during the radar look.

5 Claims, 6 Drawing Sheets

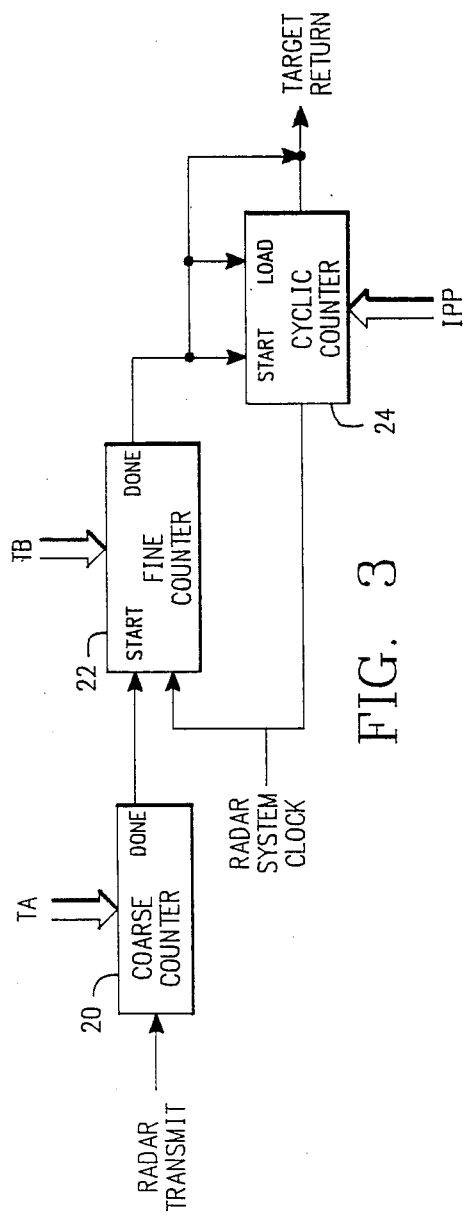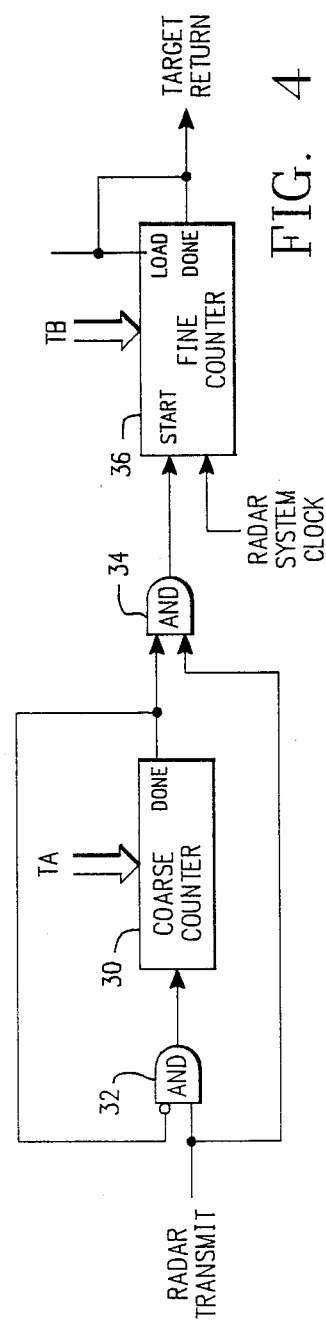
FIG. 3
FIG. 4

RADAR TARGET SIMULATOR

BACKGROUND OF THE INVENTION

1. Field of the Invention

The present invention is directed to a system that simulates radar targets, and more particularly, to a system in which pulse repetition frequency (PRF) targets in excess of 500KHz can be simulated.

2. Description of the Related Art

Radar systems must be tested before they are installed in the field. To perform this testing, simulators are used to simulate dynamic target returns that are consistent with real world expectations. Each simulated target return presented to the radar must have the following timing characteristics: 1. A return pulse should be generated for each transmit pulse regardless of the rate or pulse repetition frequency at which the transmit pulses occur. 2. Each return pulse should be delayed from its associated transmit pulse by a time $T = 2R/C$ where R is the target range and C is the speed of light. The longest delay, $T_{max}$, must be greater than or equal to the delay for real world targets located at the maximum range at which the targets are still detectable by the radar. 3. The target must be able to move smoothly with respect to the radar. To move the target digitally, the delay T must be adjusted by an amount plus or minus $\Delta T$ periodically where the size of the incremental delay $\Delta T$ is determined by the radar range resolution. If, for example, the radar can resolve target positions to within 10 feet, then the delay change can be no larger than 20 nanoseconds where the speed of light is assumed to be one foot per nanosecond. Early target simulators used relay selectable delay lines to simulate the delay between the transmit pulse and the return pulse. Depending on relay selection, when n delay lines are provided, the operator could select up to $2^n$ different delays for each return pulse If the delay lines used are coaxial cable, a very significant amount of coaxial cable is necessary because each nanosecond of delay requires approximately one foot of coaxial cable. One shot multivibrators, discreet delay devices and coaxial cable lengths provide delays typically having a tolerance of three percent. With a delay network providing an approximately two millisecond delay sufficient to simulate returns for a target at $10^6$ feet from the radar, the variance in the delay can be as high as plus or minus 60 microseconds or plus or minus 30,000 feet. As a result, delay line simulators are inadequate to simulate targets for current radar systems.

Current simulators use a range return counter approach as exemplified by U.S. Pat. No. 4,168,502. Such current simulators are generally limited to 8 KHz pulse repetition frequency (PRF) In the range return counter approach, a series of counters act as digital delay elements in the production of target returns as exemplified by the delay circuit 37 in FIG. 3 of the above-identified patent. A more detailed reproduction of such a return counter delay circuit 8 is illustrated in FIG. 1 herein The inputs of these counters 10–19 are connected together and receive the present range from the target to the radar. As each transmit pulse occurs one of the range return counters is preloaded with the range and counted down For example, for the first transmit pulse, channel one might be enabled, for the secord pulse, channel two might be enabled and etc. In this manner up to N returns may be in some stage of processing at the same time The total number of counters necessary for this approach is a function of the highest radar PRF and the maximum radar range where $N = \text{CELL}[2\text{PRF}_m (R/C)]$ with R being the maximum range, C the speed of light, $\text{PRF}_m$ the maximum PRF and N the number of return counters in operation at the same time The range return counter approach has the following drawbacks. In this approach, returns are generated only for those transmit pulses having PRFs equal to or below $\text{PRF}_m$, thus if the maximum PRF is doubled in a future radar system, twice the current number of return range counters will be required Doubling the maximum range of the radar also doubles the number of counters A radar simulator with 16 range return counters can operate at PRFs up to 16KHz for targets up to 80 nautical miles away. A typical range return counter requires 8 integrated circuits. In a radar with a PRF over 100 Khz with targets ranging up to 160 nautical miles at least 200 return range counters are required in the simulator requiring approximately 1,600 integrated circuits The range counter approach thus has severe practical limitations.

SUMMARY OF THE INVENTION

It is an object of the present invention to provide a radar target simulator with increased range resolution capabilities, and reduced cost and size target simulation circuits.

It is another object of the present invention to provide a simulator with a reduced number of components.

It is a further object of the present invention to provide a simulator capable of operating at a high pulse repetition frequency while achieving a range resolution of less than ten feet.

The above objects can be attained by a radar simulation system with two counters. A coarse counter is provided that counts transmit pulse interpulse periods to provide a coarse return delay equal to the quotient of the delay to be simulated divided by the interpulse period. A fine counter is provided to count, after the coarse counter has counted down to zero, from each transmit pulse to the time for the return pulse which is equal to the remainder of the division. Once the coarse counter has finished, the fine counter, provides return target pulses repeating at the target distance at the pulse repetition frequency. A cyclic counter can also be provided to produce the return pulse cyclically based on the interpulse period when the fine counter times out. If the target is expected to move more than the range resolution of the radar during a radar look, the simulator is provided with a phase counter that adjusts the delay of the return pulses to simulate target movement during the look.

These together with other objects and advantages which will be subsequently apparent, reside in the details of construction and operation as more fully hereinafter descrited and claimed, reference being had to the accompanying drawings forming a part hereof, wherein like numerals refer to like parts throughout.

BRIEF DESCRIPTION OF THE DRAWINGS

FIG. 3 depicts an embodiment of the present invention;

FIG. 4 illustrates another embodiment of the present invention;

DESCRIPTION OF THE PREFERRED EMBODIMENTS

Figure 1:
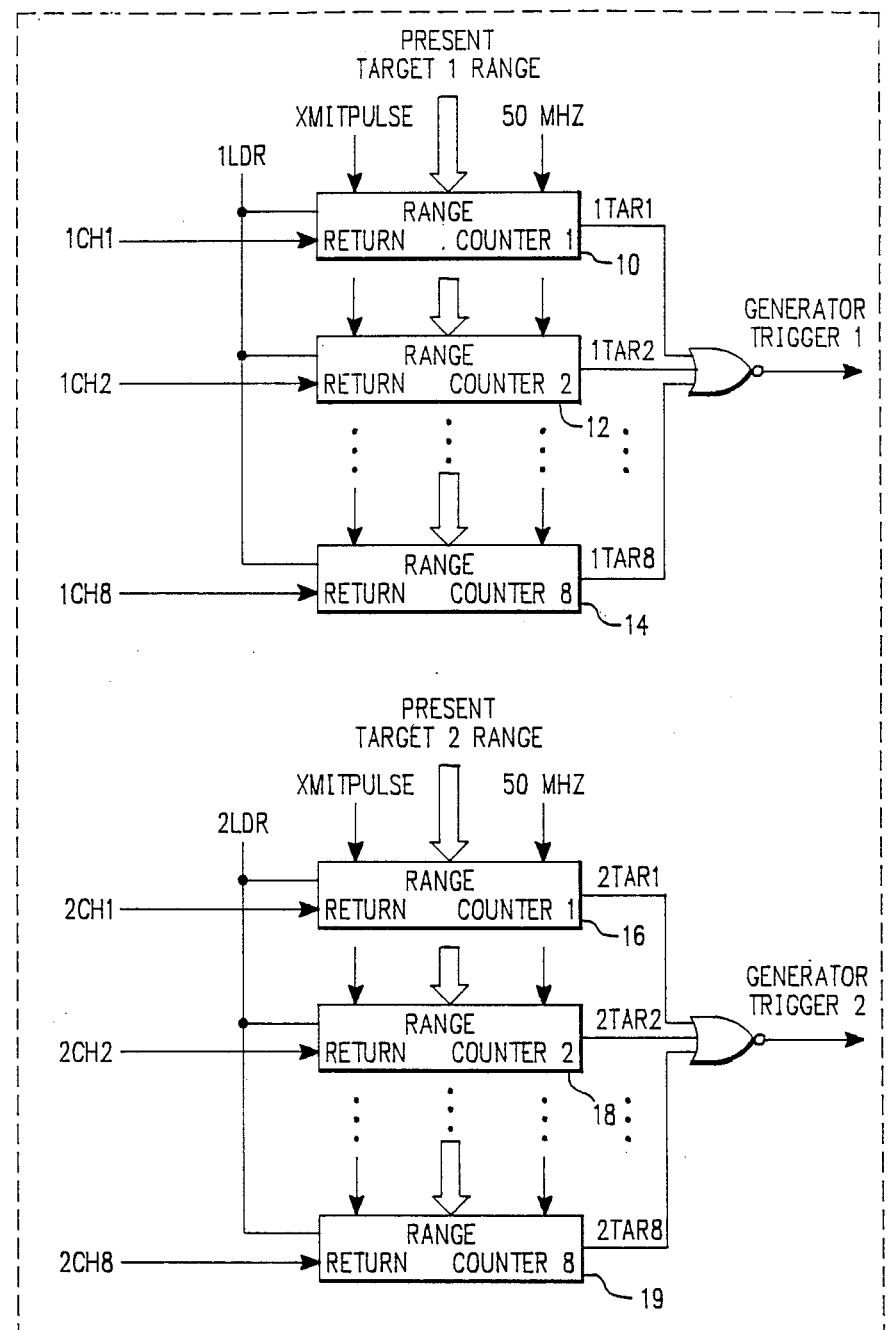
FIG. 1 is an example of a prior art range return counter target simulator 8.
Figure 2:
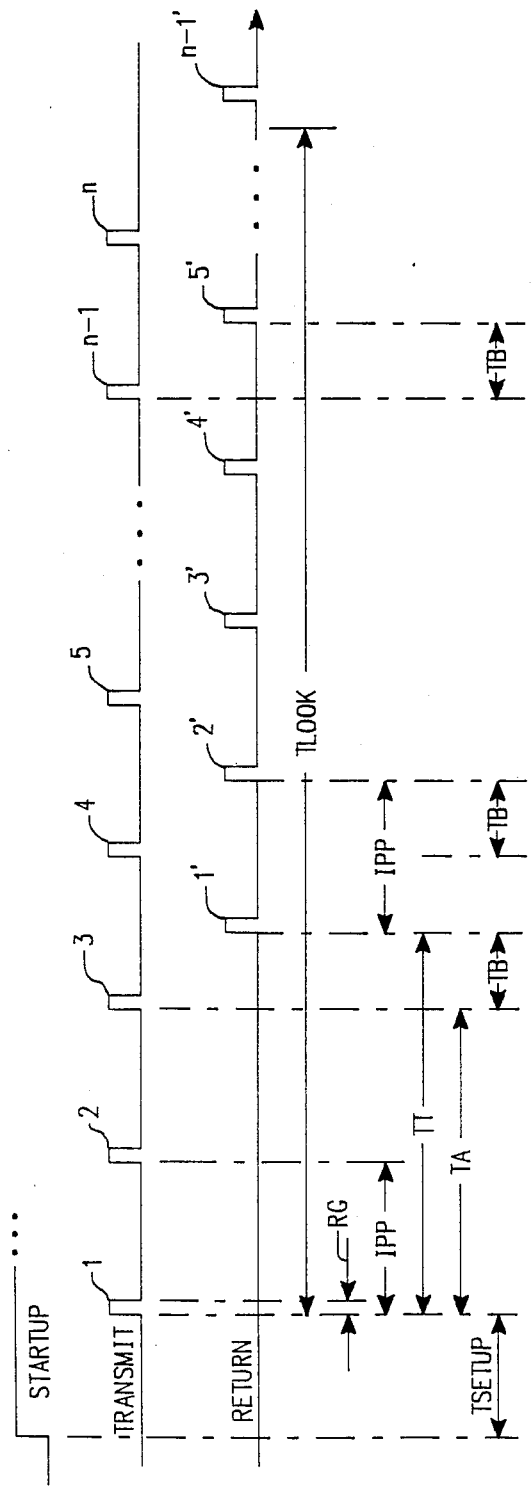
FIG. 2 illustrates the relationships between various time periods in the present invention.

The target simulator of the present invention is designed to simulate targets for radars operating with a pulse repetition frequency (PRF) from 0Hz to in excess of 500 KHz. A typical doppler radar transmits a group of pulses and processes returns from the group of transmit pulses before the next group of transmit pulses is sent. This pulse group transmission and processing is called a radar look TLOOK as illustrated in FIG. 2. The width of each transmit pulse defines the width of the range gates RG and the interpulse period IPP is equal to the width of the range gate times the number of range gates processed by the radar system. A range gate is essentially a window which corresponds to a certain range and if a return signal is present during the range gate or window a target at that range exists The time period between looks is called a set up period TSETUP The total return pulse travel time TT is proportional to the range of the simulated target The time represented by the integer number of IPPs comprising TT is equal to TA TB is equal to TT minus TA. The transmit pulses repeat at a frequency of from 0–500 KHz depending on the radar system and the radar system has a continuous digital clock typically operating in the 40–60 megahertz range for counting range gates The measurements of time illustrated in FIG. 2 occur in increments of the range gate clock period, except TB and TT which are quantized to the 40–60 system clock. Typically, the range gate clock period is 10 to 100 cycles of the system clock.

At the beginning of a radar look, information is available from the radar system from which the IPP can be derived and the simulator of the present invention accepts this information and from it calculates the IPP as a binary word weighted with the radar clock period. The simulator also receives a binary word either from the radar test system or from an operator which represents the initial range of the simulated target. This word is weighted with twice the distance traveled by a radio wave during one period of the radar clock. This word is equivalent to a binary word representing TT weighted with the period of the radar clock. By division, the simulator can calculate TA and TB. This operation generates two binary words which are the number of IPPs comprising TA and the number of radar clock periods comprising TB. The calculations described above can be performed by a high speed processor or a dedicated discreet circuit divider during the setup period which is signalled by the rising edge of the STARTUP pulse marking the beginning of a processing cycle.

During operation the simulator generates a time delay TT for each transmit pulse as illustrated in FIG. 2 For the first transmit pulse 1, as illustrated in FIG. 2, the simulator first waits the time period TA by counting IPPs marked by transmit pulses 2 and 3. The simulator then delays the amount TB from the occurrence of the transmit pulse 3 and generates a return 1'. For all returns following return 1' the simulator need only delay for the period TB from each transmit pulse. For example, return 2' will be delayed from transmit pulse 4 by the amount TB and return 3' will be delayed from return 5 by the amount TB. It is also possible, once the time period TB has expired to generate return pulses at a period equal to the IPP without using the transmit pulses as a delay start pulse. This method is also illustrated in FIG. 2.

The present invention can be implemented in a number of different ways one of which is illustrated in FIG. 3. In this preferred embodiment of the present invention, a coarse counter 20 is loaded, before the first return pulse during the setup period, with the number of interpulse periods TA to be counted. The coarse counter 20 then counts down, responsive to the radar transmit pulses, and provides an output to a fine counter 22 when the coarse counter 20 reaches zero and is done with the down counting. The fine counter 22, which is loaded with the delay period TB equal to the number of radar system clock pulses to the first return pulse, then counts down responsive to the radar system clock. When the fine counter 22 reaches zero or is done, a signal is produced which causes a cyclic counter 24 to produce a target return, load the interpulse period value IPP and begin counting down. When the cyclic counter 24 again reaches zero a target return pulse is produced, the IPP value is loaded again and counting down again starts. In this way, the coarse counter 20 and fine counter 22 count the period TT for the first return pulse 1' and then the cyclic counter 24 thereafter cyclically counts the period IPP and produces the succeeding return pulses. FIG. 3 takes advantage of the constant time period IPP between return pulses which corresponds to the time period between transmit pulses when the simulated target does not move during a look.

FIG. 4 illustrates a different embodiment of the present invention. In this embodiment once again the coarse counter 30 counts the number of interpulse periods TA in the time period TT responsive to the radar transmit pulses and produces a signal when the count reaches zero. This signal is used to close gate 32, which is an AND gate with one input inverted, to prevent further counting by the coarse counter 30. When the count reaches zero and a transmit pulse exists at the same time, this event is detected by AND gate 34 and the fine counter 36, which has been preloaded with the number of pulses in the time period TB begins counting down. When the fine counter 36 reaches zero, responsive to counting the radar system clock, a target return pulse is produced which causes the fine counter 36 to again load the value TB. When the next radar transmit pulse occurs, because the output of the coarse counter 30 is still indicating a zero count, the AND gate 32 produces another start pulse causing the fine counter 36 to begin counting down again. In this way the present invention counts the time period TB from each transmit pulse to produce a return pulse.

Figure 5:
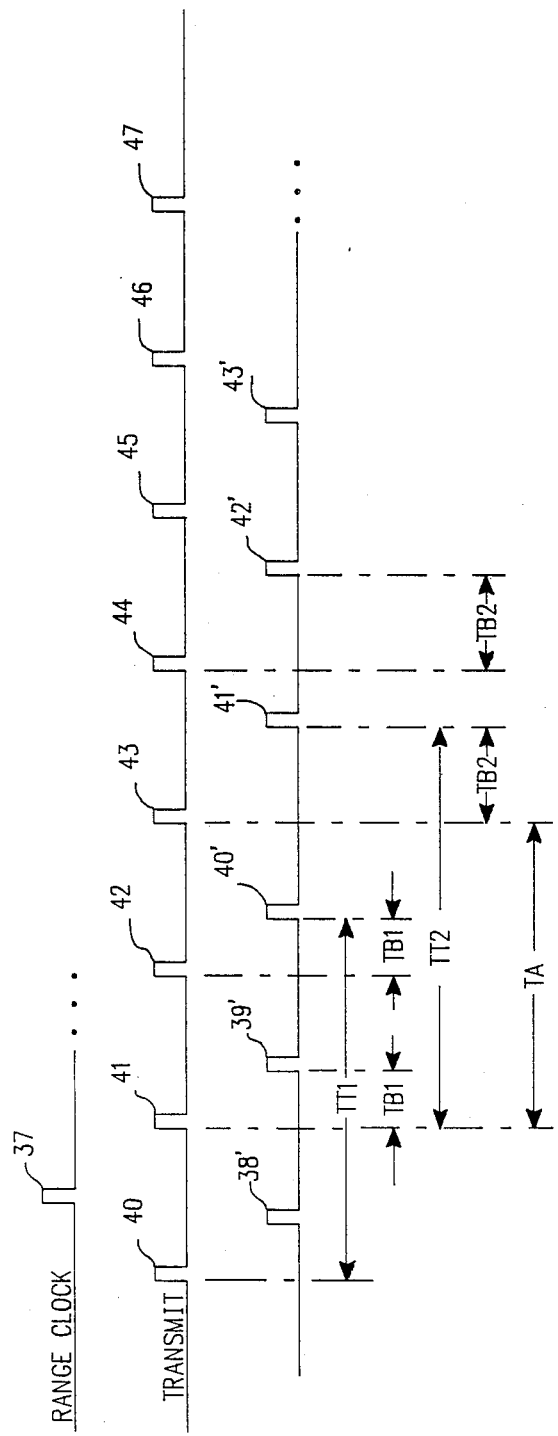
FIG. 5 is a timing diagram showing the changes in the relationships between various time periods in the present invention when movement by the target during a radar look is simulated.

Most targets will not change position sufficiently within a radar look to require that the range of the target be changed during the look. For example, if the pulse repetition frequency is 500KHz, 1024 pulses are sampled and the range resolution of the radar is twenty feet, then the target would have to be traveling directly toward or away from the radar at approximately 6800 miles per hour for a range change larger than a single radar system clock to occur. If the target to be simulated has such characteristics, the return pulses that must be produced by the simulator will appear as illustrated in FIG. 5. In this figure a range clock pulse 37 occurs between the transmit pulses 40 and 41 indicating that the range of the return pulse 41' and all subsequent pulses should be changed. A range change means a change in TT which in turn requires a change in TB and/or TA. The simulator of the present invention performs a change in TT by waiting a period of time equal to TA and then changing the delay TB and/or TA. In the example illustrated in FIG. 5 the returns 38', 39' and 40' are generated by delaying TB1 from the transmit pulses 40, 41 and 42. This results in a time TT equal to TT1 for those returns. The range clock occurring between transmit pulses 40 and 41 causes TT for all transmit pulses after 40 to be TT2. This means that the returns 41', 42', 43' etc. should be generated by delaying TB2 from the transmit clocks 43, 44, 45, etc. The simulator of the present invention as illustrated in FIG. 6 identifies the transmit pulse which must initiate the new delay TB2 by waiting a period of time TA from the first transmit occurring after the range clock.

Figure 6:
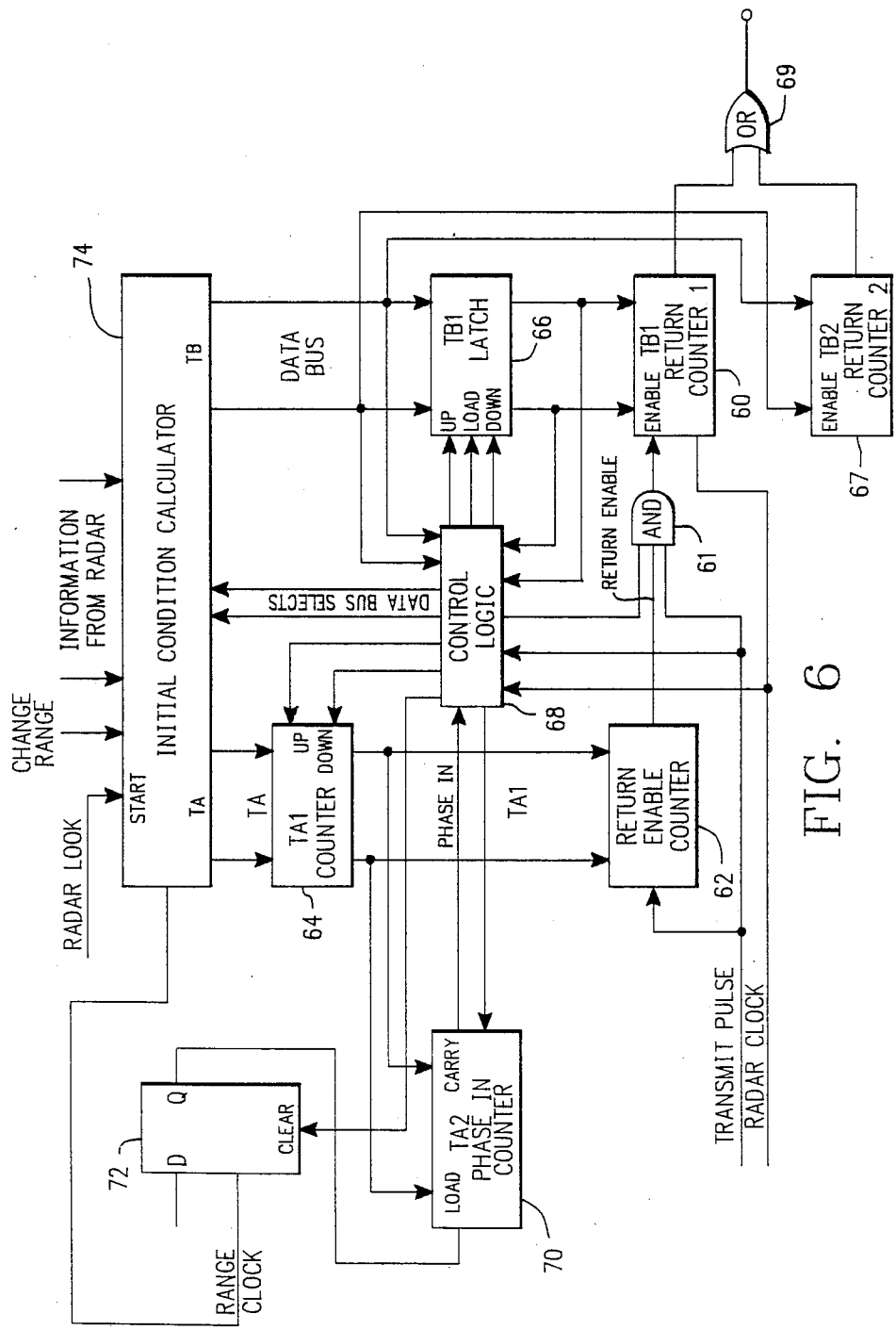
FIG. 6 illustrates an embodiment of the invention which simulates target movement during a radar look.

Central to the embodiment of the target simulator illustrated in FIG. 6 is the return counter 60. This is a high speed counter configured as a one shot digital delay. Before each transmit pulse, a return counter 60 is loaded with the binary word which represents TB. Counting by counter 60 is triggered by the leading edge of a transmit pulse. When the number of radar clock periods corresponding to TB have been counted a simulated target return is generated. The return enable counter 62 is used to generate the time delay TA. This counter 62 is loaded with the binary word equivalent to the number of transmit IPPs comprising IA. The counter 62 is clocked by the transmit pulse and when the appropriate number of transmits are counted, the signal return enable becomes active allowing targets to be generated by the return counter 60. When a simulated target undergoes a change in the range, the values of TA and TB must change accordingly. To facilitate this, the binary words representing TA2 and TB2 are stored in the phase-in counter 70 and the counter 67, respectively. As previously mentioned, changes in TA and TB occur in response to the range clock pulse 37. This is a pulse input to the system with a repetition rate which is proportional to the target velocity The control logic clocks the changes in target range that are previously known When a new value for the coarse part TA or TA2 of the range TT2 is available, it is loaded into the phase-in counter 70 at the first transmit pulse after the range clock. When the phase-in counter 70 times out return counter 67 starts down counting using the new value of TB, that is TB2. The latch 66 stores the new value TB2 while counter 60 continues to count the old value TB1. Subsequent returns are processed using the new TB2 in counter 60 The outputs of counters 60 and 67 are both output by gate 69. This embodiment will handle situations in which the coarse range TA is increasing, decreasing or remains the same. When IPP equals 100 and TT decreases from 203 to 197, two return pulses must be created in the same IPP. In this situation TA1=2, TB1=3, TA2=1 and TB2=97. Using two counters 60 and 67 allows this situation to be simulated. When the range increases, an IPP can contain no return pulses If TT increases from 197 to 203, then TA1=1, TB1=97, TA2=2 and TB2=3. Once again two counters 60 and 67 allow this situation to be simulated. If TT increases from 203 to 260, when IPP=100, TA1=2, TB1=3, TA2=2 and TB2=60. This situation is also handled by the embodiment of FIG. 6. The initial condition calculator 74 accepts information from the radar relating to the PRF and the desired initial range, determines the interpulse period and the values TA and TB. Because the initial condition calculator 74 must perform a complete calculation within a single interpulse period and a discreet component high speed divider, as illustrated in FIG. 7, is preferred, although a very high speed processor could also be used.

Figure 7:
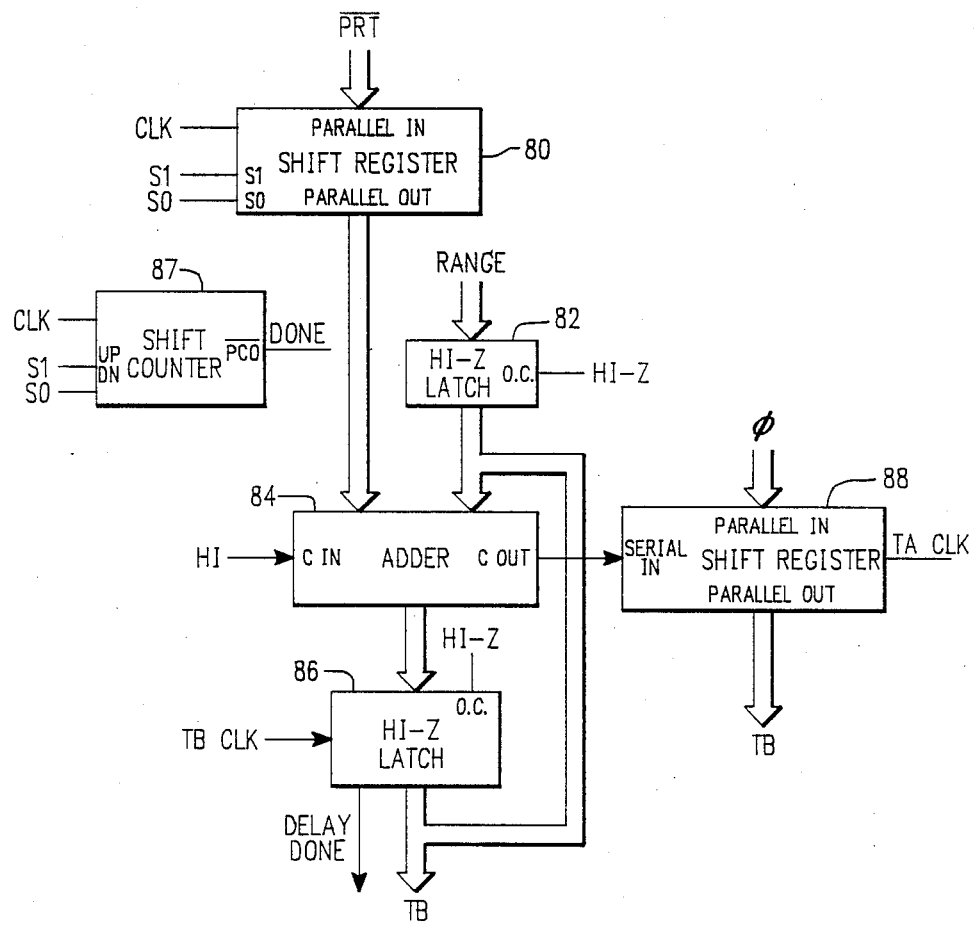
FIG. 7 shows the construction of the high speed calculator 74 of FIG. 6

At the beginning of the operation the size of the interpulse period measured in range gates is loaded into shift register 80 of FIG. 7 and the range of the target is loaded into the latch 82. The contents of register 80 are left shifted until the most significant bit becomes a 1. During each shift the shift counter 86 is counted up. When the most significant bit is detected, the content of the shift register 80 is subtracted from the range in latch 82 by the adder 84 and stored in the latch 86. At the same time the shift counter counts down one. If the shifted divisor in register 80 is greater than the dividend stored in latch 86, the same partial dividend is maintained and the shift carry bit, as previously mentioned, is shifted into register 88. Next the contents of register 80 is right shifted and a subtraction by the adder of the contents of register 80 from the contents of register 86 occurs. If the subtraction results in a positive answer the new partial dividend is latched and the carry bit is shifted into register 88. The shift and subtraction operation continues until the shift counter 86 reaches 0. When this occurs the remainder TB is stored in latch 86 and the quotient TA is stored in register 88 As can be seen from the above discussion the hardware of FIG. 7 is simply implementing a well known polynomial divide or shift-and-subtract algorithm.

The target simulator of the present invention is designed for radars operating with PRFs from 0KHz to in excess of 500Khz. The target simulator can be used in testing any pulse radar system which uses a constant PRF over the period of a radar look. The ability of this target simulator to synchronize events within a series of transmit pulses can be used to synchronize other operations needed in target simulation.

The many features and advantages of the invention are apparent from the detailed specification and thus it is intended by the appended claims to cover all such features and advantages of the invention which fall within the true spirit and scope of thereof. Further, since numerous modification and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A target simulator trigger signal generator, comprising:
   coarse delay means for providing a coarse delay equal to a number of interpulse periods occurring during a delay required for a target return pulse to be simulated; and
   fine delay means, actuated by said coarse delay means, for providing a trigger signal for the return pulse after a fine delay equal to a difference between the coarse delay and the delay required for the return pulse.

2. A target simulator trigger signal generator as recited in claim 1, further comprising cyclic means, actuated by said fine delay means, for cyclically producing the return pulse with a period equal to the interpulse period.

3. A target simulator trigger signal generator as recited in claim 1, further comprising target range change means for chaning the coarse and/or the fine delay when a target to be simulated changes a simulated range.

4. A target simulator trigger signal generator as recited in claim 3, wherein said change means includes phase means for determining a time for changing the coarse and fine delays.

5. A target simulator trigger signal generator, comprising:
   a coarse counter down counting a quotient of a division of a target range by an interpulse period responsive to a radar transmit pulse;
   a fine counter connected to said coarse counter and down counting a remainder of the division when said coarse counter reaches zero responsive to a radar system clock; and
   a cyclic counter connected to said fine counter, cyclically down counting the interpulse period responsive to the radar system clock when said fine counter reaches zero and producing a trigger signal for a target return pulse each time said cyclic counter reaches zero.

* * * * *